United States Patent [19]

McDermott

[11] 3,824,047

[45] July 16, 1974

[54] FLOATING ROTARY RING MEMBER OF FLUID DISPLACEMENT DEVICE

[76] Inventor: Hugh L. McDermott, 6101 Ashcroft Ave., Minneapolis, Minn. 55424

[22] Filed: Mar. 23, 1973

[21] Appl. No.: 344,362

[52] U.S. Cl. ............................................. 418/171
[51] Int. Cl. ................................................ F01c 1/00
[58] Field of Search ................................... 418/171

[56] References Cited
UNITED STATES PATENTS
3,584,986   6/1971   Hansen et al. ........................ 418/171

Primary Examiner—C. J. Husar
Attorney, Agent, or Firm—Merchant, Gould, Smith & Edele

[57] ABSTRACT

A rotary fluid displacement device operable selectively as a fluid pump or a motor and utilizing a rotor having an outer cylindrical surface and comprising intermeshing internally and externally toothed members, each rotating on its own axis within a rotor chamber defined by a housing. The rotor chamber has opposite end walls and a peripheral wall, the peripheral wall including a pair of circumferentially spaced recesses and arcuate wall portions intermediate the recesses. The arcuate wall portions are spaced from the outer cylindrical rotor surface, and a pair of resilient mounting members in the recesses have sliding sealing engagement with the rotor.

8 Claims, 6 Drawing Figures

PATENTED JUL 16 1974  3,824,047
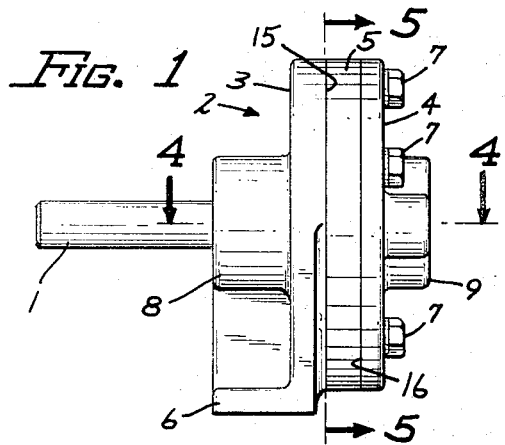
Fig. 1
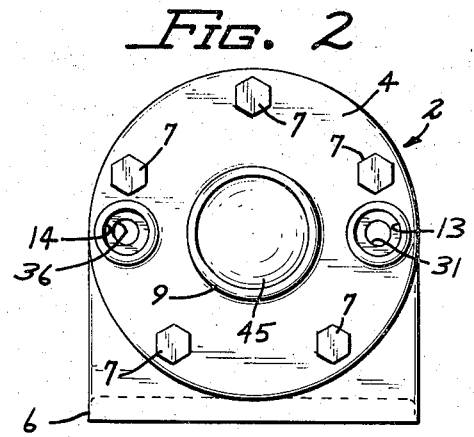
Fig. 2
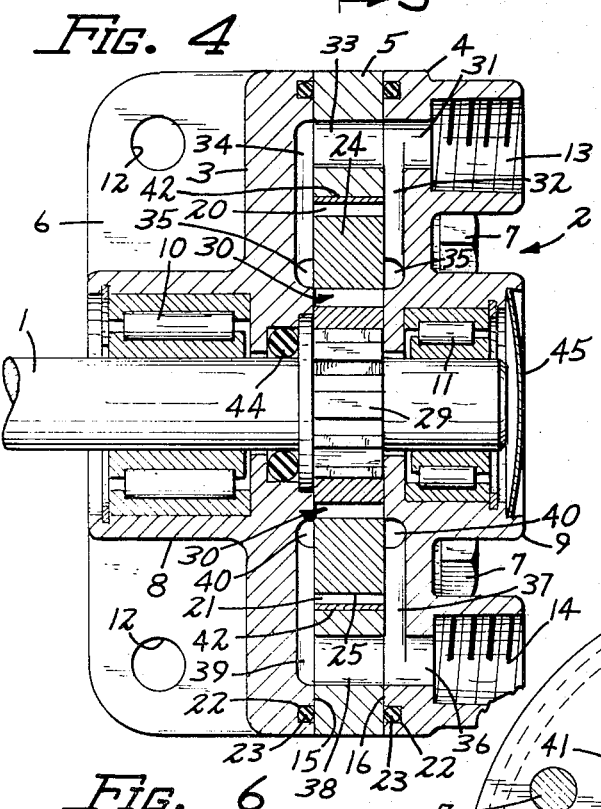
Fig. 4
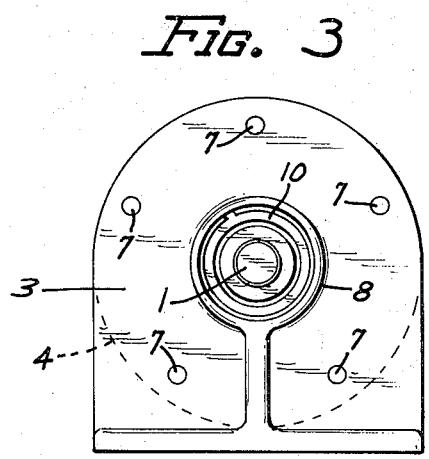
Fig. 3
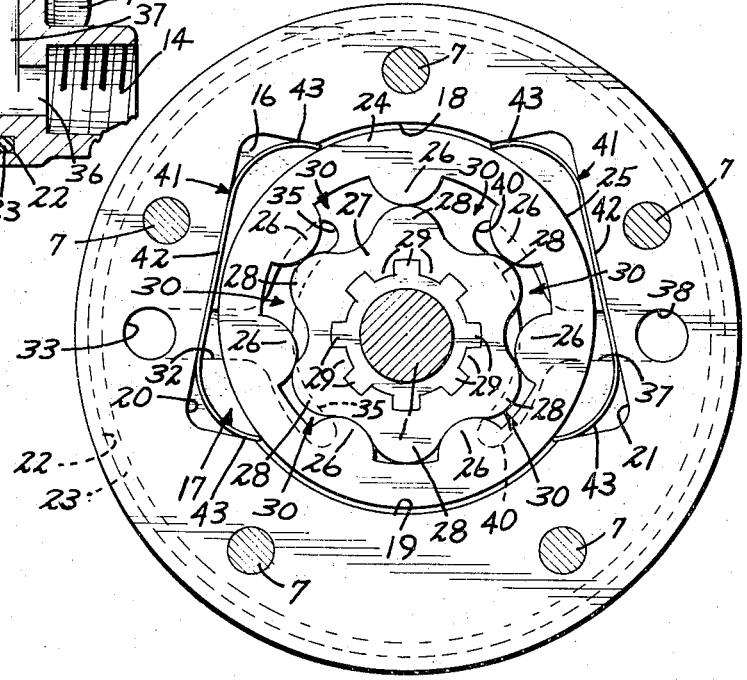
Fig. 5
Fig. 6

3,824,047

FLOATING ROTARY RING MEMBER OF FLUID DISPLACEMENT DEVICE

BACKGROUND OF THE INVENTION

Rotary fluid displacement devices utilizing intermeshing internally and externally toothed members, each rotating on its own axis, are known, some of these being manufactured and sold under the trademark "GEROTOR." In devices of this type, the externally toothed member has one tooth less than the internally toothed member, the teeth cooperating to define successively expanding and contracting fluid compartments during rotation of the members. Usually, the externally toothed member is mounted on a shaft and the internally toothed member is journaled in the housing which also journals the shaft and defines a chamber for the members. This arrangement requires close tolerances for proper operation of the device, rendering the same quite expensive to produce. Additionally, as the teeth begin to wear, early leakage occurs between the teeth, appreciably reducing the efficiency of the device.

SUMMARY OF THE INVENTION

An important object of this invention is the provision of a rotary fluid displacement device utilizing cooperating internally and externally toothed gears and having means for compensating for wear between the intermeshing gear teeth of the gears.

Another object of this invention is the provision of a rotary fluid displacement device of the type set forth having a rotor mounting arrangement wherein friction between a rotor and a housing therefor is materially reduced from that found in devices of similar types heretofore produced.

Yet another object of this invention is the provision of a rotary fluid pressure displacement device as set forth in which at least some of the machining tolerances are substantially expanded relative to those in similar prior devices, whereby to materially reduce the costs of manufacture thereof.

To the above ends, I provide a rotary fluid displacement device, operable selectively as a fluid pump or a fluid pressure operated motor, and utilizing intermeshing internally and externally toothed ring and star members, the former of which has a cylindrical outer surface, and the latter of which has one less number of teeth than the former. The members are eccentric to each other, each rotating on its own axis within a rotor chamber defined by a housing having inlet and outlet ports and fluid passages connecting the ports to spaced portions of the rotor chamber. During rotation of the ring and star members, the teeth thereof move successively between full meshing engagement and generally circumferential sliding engagement out of meshing engagement with each other, progressively defining fluid compartments which alternately expand and contract in size. The rotor chamber has a pair of axially opposed end walls and a peripheral wall surrounding the members. The peripheral wall has a pair of circumferentially spaced recesses opening radially into the chamber, and a pair of diametrically opposed arcuate wall portions that are substantially concentric with the cylindrical surface of the ring member. The diameter of the cylindrical surface and the radii of the arcuate wall portions are such that a substantially greater than normal running clearance exists between the ring member and the arcuate wall portions.

A pair of resilient mounting members are contained each in a different one of the recesses and have portions that slidably engage the cylindrical surface of the ring member and yieldingly urge the ring member in a direction transversely of its axis and tending to move the intermeshing ones of the gear teeth radially away from meshing engagement with each other. The ring member engaging portion of the resilient mounting members provide for relatively small bearing surfaces for floatingly holding the ring member in place during rotation of the members. The star member is rigidly mounted on a shaft journaled in the housing.

DESCRIPTION OF THE DRAWINGS

FIG. 1 is a view in side elevation of a rotary fluid displacement device produced in accordance with this invention;

FIG. 2 is a view in end elevation, as seen from the right to the left with respect to FIG. 1;

FIG. 3 is a view in opposite end elevation;

FIG. 4 is an enlarged axial section taken substantially on the line 4—4 of FIG. 1, some parts being broken away;

FIG. 5 is an enlarged view, partly in elevation and partly in section, taken on the line 5—5 of FIG. 1; and FIG. 6 is a view in perspective of one of the rotor mounting members of this invention.

DETAILED DESCRIPTION OF THE PREFERRED EMBODIMENT

The rotary fluid displacement device of this invention may be utilized as a fluid pump or motor, as desired. For the purpose of the present example, it will be described as a rotary fluid pump having a shaft 1 that is adapted to be operatively coupled to any driving connection, such as a motor, not shown. The pump includes a housing 2 comprising housing end sections 3 and 4 and an intermediate section 5. The housing section 3 includes a base portion 6, the sections 4 and 5 being generally circular in outline, all of the sections 3–5 being connected together by a plurality of circumferentially spaced machine screws or the like 7. The end sections 3 and 4 are provided with bosses 8 and 9 respectively, each of which contains respective rolling friction bearings 10 and 11 which journal axially spaced portions of the drive shaft 1. Preferably, the base portion 6 is provided with spaced openings 12 for reception of mounting bolts or the like, not shown. The housing section 4 is formed to provide a like, not shown. The housing section 4 is formed to provide a pair of circumferentially spaced bosses which define internally threaded fluid ports 13 and 14, the former of which may be assumed to be an inlet port and the latter a discharge port.

The intermediate housing section 5 has flat opposite sides which abuttingly engage respective flat surfaces 15 and 16 of the housing sections 3 and 4 respectively, the surfaces 15 and 16 defining the opposite end walls of a rotor chamber 17 having a peripheral wall defined by the intermediate housing section 5. The peripheral wall comprises diametrically opposed arcuate wall surface portions 18 and 19 of respective relatively short and relatively long circumferential lengths, and a pair of radially inwardly opening recesses 20 and 21. Adjacent their outer edges, the wall surfaces 15 and 16 are provided with annular grooves 22 having mounted therein sealing rings 23, see FIG. 4

Rotor means disposed within the rotor chamber 17 comprises an outer ring member 24 having a cylindrical outer surface 25 and a plurality of circumferentially spaced internal teeth 26, and a cooperating star member 27 having a plurality of circumferentially spaced external teeth 28. The star member 28 is rigidly mounted on the shaft 1, by means of spline teeth 29 for common rotation with the shaft 1. The star member 27 is disposed within the ring member 24 and is so arranged that the teeth 26 and 28 move into and out of intermeshing engagement during rotation of the members 24 and 27. With reference to FIG. 5, it will be seen that the teeth 28 are one less in number than the teeth 26, and that each of the members 24 and 27 rotates on an individual axis in spaced parallel relation to the axis of the other member. In the embodiment of the invention illustrated, the star member 27 rotates on the axis of the shaft 1, the ring member 24 rotating substantially on the axis of the arcuate wall portions 18 and 19. The teeth 26 and 28 are so arranged that each thereof moves slidingly into and out of engagement with the teeth of the other member during common rotation of the members 24 and 27 on their individual axes, to define fluid compartments 30 that expand and contract responsive to said rotation of the members 24 and 27. Due to the difference in number between the teeth 26 and 28, the ring member 24 partakes of a lesser number of revolutions per given time interval than does the star member 27. In the arrangement illustrated, the ring member has seven teeth 26, whereas the star member has six teeth 28. With this arrangement, the star member 24 partakes of six revolutions for every seven revolutions of the star member 27. Hence, the teeth 26 and 28 have continuous sliding engagement therebetween during rotation of the members 24 and 27.

Fluid communication is had between the inlet port 13 and the expanding ones of the fluid compartments 30, by means of an inlet passage 31 and a radial branch passage 32 in the housing section 4, a transverse passage 33 through the housing section 5 in alignment with the passage 31, and a radial branch passage 34 in the housing section 3. The radial branch passages 32 and 34 are in the nature of grooves cut into the wall surfaces 16 and 15 respectively, and terminate at their inner ends in circumferentially extended end portions 35. In like manner, the outlet or discharge port 14 communicates with the contracting fluid compartments 30 by means of a discharge passage 36 and a radial branch passage 37 in the housing section 4, a transverse passage 38 through the housing section 5 in alignment with the discharge passage 36, and a radial branch passage 39 in the housing section 3, the radial passages 37 and 39 being diametrically opposite the radial passages 32 and 34 respectively. The radial passages 37 and 39 terminate at their inner ends in circumferentially extended portions 40.

A pair of generally U-shaped mounting members for the ring member 24 are indicated generally at 41 and are each contained in a different one of the recesses 20 and 21. Each of the mounting members comprises a strip of flexible resilient metal, such as spring steel or bronze alloy, formed to provide an elongated intermediate portion 42 and inturned end portions 43. The intermediate portions 42 are adapted to lie against the radially outer or bottom portions of their respective recesses 20 and 21, the free ends of the inturned portions 43 being adapted to slidably engage the cylindrical outer surface 25 of the ring member 24, as shown in FIG. 5. The mounting members 42 are so shaped that the free ends of the inturned portions 43 are yieldingly biased into sliding and fluid sealing engagement with the outer cylindrical surface 25 of the ring member 24. Further, with reference to FIG. 5, it will be seen that the recesses 20 and 21 are so located circumferentially of the ring member 24 and star member 27, that the mounting members 41 not only tend to center the ring member 24 generally horizontally with respect to FIG. 5, but also urge the ring member 24 downwardly so that the teeth 26 thereof that are in out of mesh sliding engagement with the star member teeth 28 are yieldingly urged toward sliding engagement with the out of mesh teeth 28, whereby to provide for effective sealing engagement between the out of mesh teeth 26 and 28, so that the expanding and contracting compartments 30 are effectively sealed from each other. It will be further noted, with reference to FIG. 5, that the clearance between the outer cylindrical surface 25 and the arcuate surfaces 18 and 19 is substantially greater than normal running clearance between the ring member 24 and housing section 5. This arrangement provides that only the free ends of the members 41 have bearing engagement with the cylindrical surface 25, and eliminates to a large degree the viscous drag normally found in a full circumference bearing surface and the high energy required to shear the oil in such a full circumference bearing. As wear occurs between the interengaging surfaces of the teeth 26 and 28, the resilience of the mounting members 41 urge the ring member 24 in a downward direction with respect to FIG. 5, as above indicated, to compensate for such wear, so that a substantially longer effective working life of the device is assured.

In the device shown, a conventional sealing ring 44 is utilized to prevent leakage of fluid from the interior of the chamber 17 to the bearing 10, and a sealing cap or the like 45 is provided in the boss 9 axially outwardly of the adjacent end of the shaft 1.

While I have shown and described a commercial embodiment of rotary fluid displacement device, it will be understood that the same is capable of modification without departure from the spirit and scope of the invention, as defined in the claims.

What is claimed is:

1. A rotary fluid displacement device comprising:
   a. a housing defining;
      1. a rotor chamber having spaced generally flat end walls and a peripheral wall defining a pair of circumferentially spaced radially inwardly opening recesses and diametrically opposed arcuate wall portions between said recesses,
      2. a fluid inlet port,
      3. a fluid outlet port,
      4. and a fluid passage means extending from said ports to said chamber;
   b. rotor means in said chamber, said rotor means having axially opposite end surfaces slidably engaging said end walls and a cylindrical outer surface;
   c. said arcuate peripheral wall portions having a diameter greater than that of the outer cylindrical surface of said rotor means to provide greater than normal running clearance between said arcuate wall portions and said rotor means;

d. and a pair of mounting members each disposed in a different one of said recesses and each having portions spaced apart circumferentially of said rotor means for sliding engagement with said cylindrical surface of the rotor means.

2. The rotary fluid displacement device defined in claim 1 in which said rotor means comprises an internally toothed ring member and an externally toothed star member, said ring member having said cylindrical outer surface, said star member having one less number of teeth than said ring member and being eccentrically disposed therein in meshing engagement of some of the teeth of the star member with some of the teeth of said ring member.

3. The rotary fluid displacement device defined in claim 2 characterized by a rotary shaft journaled in said housing, said star member being mounted on said shaft for rotation therewith.

4. The rotary fluid displacement device defined in claim 1 in which said mounting members are of generally U-shape, each thereof having intermediate portions elongated in a direction generally tangentially of said rotor means and inturned opposite end portions engaging said cylindrical surface.

5. The rotary fluid displacement device defined in claim 4 in which said inturned end portions of the mounting members are disposed to slidably engage said cylindrical surface adjacent the opposite ends of said arcuate peripheral chamber wall portion.

6. The rotary fluid displacement device defined in claim 5 in which said mounting members comprise lengths of flexible resilient strip material, said inturned end portions being yieldingly biased into engagement with said cylindrical surface.

7. The rotary fluid displacement device defined in claim 1 in which said ring and star members cooperate to define fluid compartments which expand and contract responsive to rotation of said rotor means, said passage means being disposed to connect said inlet port with the expanding compartments to connect the outlet port with the contracting compartments, passage means communicating with different ones of said recesses.

8. The rotary fluid displacement device defined in claim 1 in which said rotor means comprises, an internally toothed ring member having said outer cylindrical surface, and an externally toothed star member having one less number of teeth than said ring member and disposed within said ring member eccentric thereto and in meshing engagement of some of the teeth of the star member with some of the teeth of the ring member, the axes of the ring and star members being disposed in spaced parallel relationship, the teeth of said members moving successively between full meshing engagement and generally non-meshing circumferential sliding engagement relative to each other responsive to rotation of said members on their respective axes and progressively defining fluid compartments which alternately expand and contract during said rotation of the members, said mounting members being formed from flexible resilient material and being disposed to yieldingly urge the ring member in a direction transversely of its axis to move said generally non-meshing ones of the ring member teeth toward said sliding engagement with respective teeth of the star member.

* * * * *